(12) United States Patent
Preston (10) Patent No.: US 12,258,500 B2
(45) Date of Patent: Mar. 25, 2025

(54) ADHESIVE MATERIALS

(71) Applicant: Paul Preston, Corona Del Mar, CA (US)

(72) Inventor: Paul Preston, Corona Del Mar, CA (US)

(73) Assignee: Paul Preston, Corona Del Mar, CA (US)

( * ) Notice: Subject to any disclaimer, the term of this patent is extended or adjusted under 35 U.S.C. 154(b) by 0 days.

(21) Appl. No.: 17/546,904

(22) Filed: Dec. 9, 2021

(65) Prior Publication Data

US 2022/0186080 A1 Jun. 16, 2022

Related U.S. Application Data

(60) Provisional application No. 63/123,774, filed on Dec. 10, 2020.

(51) Int. Cl.
*C09J 7/20* (2018.01)
*C09J 7/38* (2018.01)

(52) U.S. Cl.
CPC . *C09J 7/20* (2018.01); *C09J 7/38* (2018.01); *C09J 2301/122* (2020.08); *C09J 2301/124* (2020.08); *C09J 2301/18* (2020.08); *C09J 2301/204* (2020.08)

(58) Field of Classification Search
CPC . C09J 7/20; C09J 7/38; C09J 2301/122; C09J 2301/124; C09J 2301/18; C09J 2301/204; Y10T 428/14; Y10T 428/28
See application file for complete search history.

(56) References Cited

U.S. PATENT DOCUMENTS

| | | | | |
|---|---|---|---|---|
| 1,827,636 A | * | 10/1931 | Ames | B65D 75/5844 229/203 |
| 2,778,562 A | * | 1/1957 | Tilly | B65D 5/541 206/815 |
| 2,805,485 A | * | 9/1957 | Krummel | D05B 81/00 428/192 |
| 3,143,208 A | * | 8/1964 | Sizemore, Jr. | A61F 13/023 602/903 |
| 3,794,554 A | * | 2/1974 | Caring | C09J 7/20 428/102 |
| 3,873,018 A | * | 3/1975 | Donnay | B65D 55/0854 215/246 |
| 4,562,102 A | | 12/1985 | Rabuse et al. | |
| 4,647,485 A | * | 3/1987 | Nelson | C09J 7/20 428/137 |
| 4,758,021 A | * | 7/1988 | Fukuda | B42C 9/00 270/58.08 |

(Continued)

*Primary Examiner* — Patricia L. Nordmeyer
(74) *Attorney, Agent, or Firm* — MASCHOFF BRENNAN (57) ABSTRACT

In one embodiment, an adhesive material includes a backing material including a first edge and a second edge positioned opposite of the first edge. An adhesive is applied to a first side of the backing material. The first side of the backing material includes an adhesive-free region positioned between the first edge and the second edge and the backing material is structured to facilitate separation of the backing material along a predetermined path in the adhesive-free region. In one aspect, the predetermined path is formed by a number of predefined features such as perforations or indentations, although other variables are possible.

8 Claims, 5 Drawing Sheets

(56) References Cited

U.S. PATENT DOCUMENTS

| | | | | |
|---|---|---|---|---|
| 4,792,473 A * | 12/1988 | Vitale | ............... | E04F 13/04 |
| | | | | 428/137 |
| 4,884,826 A * | 12/1989 | Slagsvol | ............... | B42D 1/005 |
| | | | | 281/38 |
| 4,889,234 A * | 12/1989 | Sorensen | ............... | B65D 5/708 |
| | | | | 428/41.9 |
| 4,936,464 A * | 6/1990 | Kim | ............... | B65D 77/36 |
| | | | | 229/123.1 |
| 4,980,212 A * | 12/1990 | Marquis | ............ | B42D 15/0093 |
| | | | | 283/67 |
| 5,054,618 A * | 10/1991 | Kim | ............... | B65D 77/36 |
| | | | | 229/123.3 |
| 5,087,310 A * | 2/1992 | Robinette | ......... | B65D 63/1009 |
| | | | | 206/451 |
| 5,358,757 A * | 10/1994 | Robinette | ............... | E04F 21/00 |
| | | | | 229/123.2 |
| 5,405,197 A | 4/1995 | Makowka | | |
| 5,431,279 A * | 7/1995 | Robinette | ............... | E04F 21/00 |
| | | | | 206/451 |
| 5,658,632 A * | 8/1997 | Krabill | ............... | B05B 12/24 |
| | | | | 428/57 |
| 5,972,455 A | 10/1999 | Barry | | |
| 6,541,089 B1 * | 4/2003 | Hamerski | ............... | C09J 7/20 |
| | | | | 428/40.1 |
| 6,912,798 B2 | 7/2005 | Blau et al. | | |
| 6,953,602 B2 | 10/2005 | Carte et al. | | |
| 9,139,344 B2 * | 9/2015 | Beard | ............... | B65D 5/0236 |
| 11,345,115 B2 * | 5/2022 | Cara | ............... | C09J 7/203 |
| 2007/0063008 A1 | 3/2007 | El-Afandi | | |
| 2014/0342114 A1 | 11/2014 | Beard | | |

\* cited by examiner

ADHESIVE MATERIALS

CROSS REFERENCE TO RELATED APPLICATIONS

The subject application claims priority to U.S. Provisional Patent Application No. 63/123,774 filed Dec. 10, 2020. The content of this application is incorporated herein by reference in its entirety.

FIELD

The present disclosure generally relates to adhesive materials. More particularly, but not exclusively, the present disclosure relates to an adhesive material which may couple a number of items together and be structured to facilitate separation thereof along a predetermined path to release the items.

BACKGROUND

Unless otherwise indicated herein, the materials described herein are not prior art to the claims in the present application and are not admitted to be prior art by inclusion in this section.

A number of approaches may be utilized to couple various items together. For example, ropes, straps or other similar components may be used to secure positioning of one or more items together or relative to one another. However, use these of components may be time intensive and require various tools for their application and removal. In the context of the shipping industry for example, these issues may increase costs and transaction times which, given the high volumes often involved, may become significant over time. In addition, these issues may result in improper securing of items, or even a failure to secure the items in the first instance if individuals forego the same due to a perceived hassle associated therewith. Items may also be damaged when tools must be used to remove components used for securing the items during shipping. For example, the items may be cut, scratched or dented by a knife or other tool when the components are removed. Consequently, a number of items may ultimately be damaged during the shipping process.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In one embodiment, an adhesive material includes a backing material including a first edge, a second edge positioned opposite of the first edge, and at least one row of perforations positioned between the first edge and the second edge. The adhesive material also includes an adhesive applied to a first side of the backing material. The first side of the backing material includes an adhesive-free region and the at least one row of perforations is positioned in the adhesive-free region.

In another embodiment, an adhesive material includes a backing material including a first edge and a second edge positioned opposite of the first edge. An adhesive is applied to a first side of the backing material. The first side of the backing material includes an adhesive-free region positioned between the first edge and the second edge and the backing material is structured to facilitate separation of the backing material along a predetermined path in the adhesive-free region.

In still another embodiment, a method includes coupling a first item and a second item with an adhesive material. The adhesive material includes a backing material including a first edge and a second edge positioned opposite of the first edge and an adhesive applied to a first side of the backing material. The first side of the backing material includes an adhesive-free region positioned between the first edge and the second edge and the backing material is structured to facilitate separation of the backing material along a predetermined path in the adhesive-free region. The method also includes splitting the adhesive material along the adhesive-free region to separate the first item from the second item.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

The present disclosure generally relates to adhesive materials. More particularly, but not exclusively, the present disclosure relates to an adhesive material which may couple a number of items together and be structured to facilitate separation thereof along a predetermined path to release the items. Although various embodiments may be described in the context of use in coupling or securing together cargo or other items in the shipping industry, embodiments disclosed herein may be employed in other fields or operating environments where the functionality disclosed herein may be useful. Accordingly, the scope of the invention should not be construed to be limited to the example implementations and operating environments disclosed herein.

Figure 1:
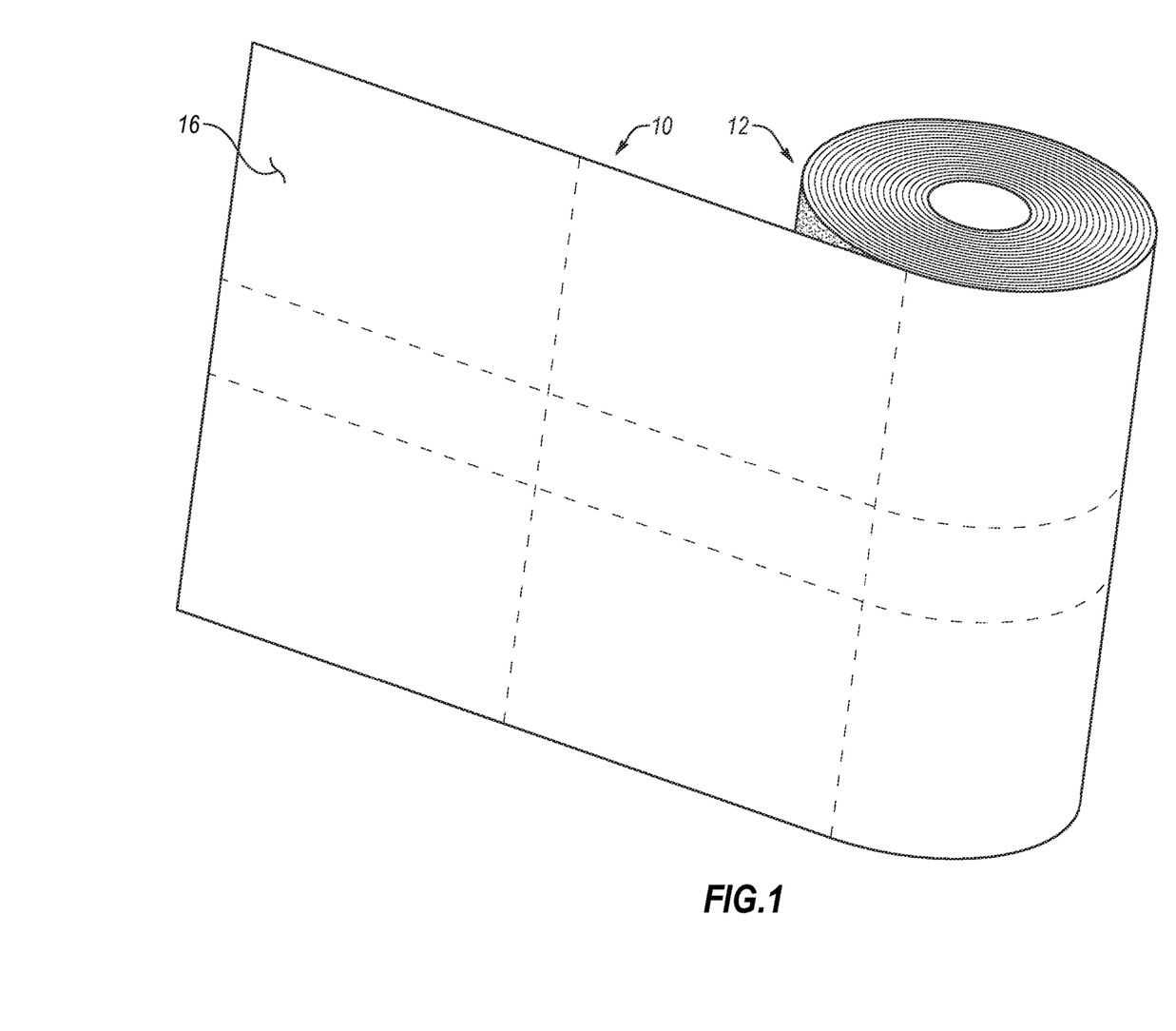
FIG. 1 is a perspective view of a roll of an adhesive material.

With reference now to FIG. 1, an adhesive material 10 is provided in a roll 12, although forms are possible where the adhesive material 10 is provided in individuals pieces such as strips or segments, just to provide a few examples. Additional details of the adhesive material 10 are provided in further connection with FIGS. 2-4, where a portion 14 of the adhesive material 10 separated from the roll 12 is illustrated. The adhesive material 10 includes a backing material 16 which extends between a first edge 18 and a second edge 20 positioned opposite of the first edge 18. In the portion 14 of the adhesive material 10 as illustrated, the backing material 16 also extends along a longitudinal axis L between a first end 22 and a second end 24 positioned opposite of the first end 22. However, as will be explained in greater detail below, the adhesive material 10, both in the roll 12 and in the portion 14, may be separated into a number of different pieces or segments having different lengths and ends relative to what is illustrated.

Figure 2:
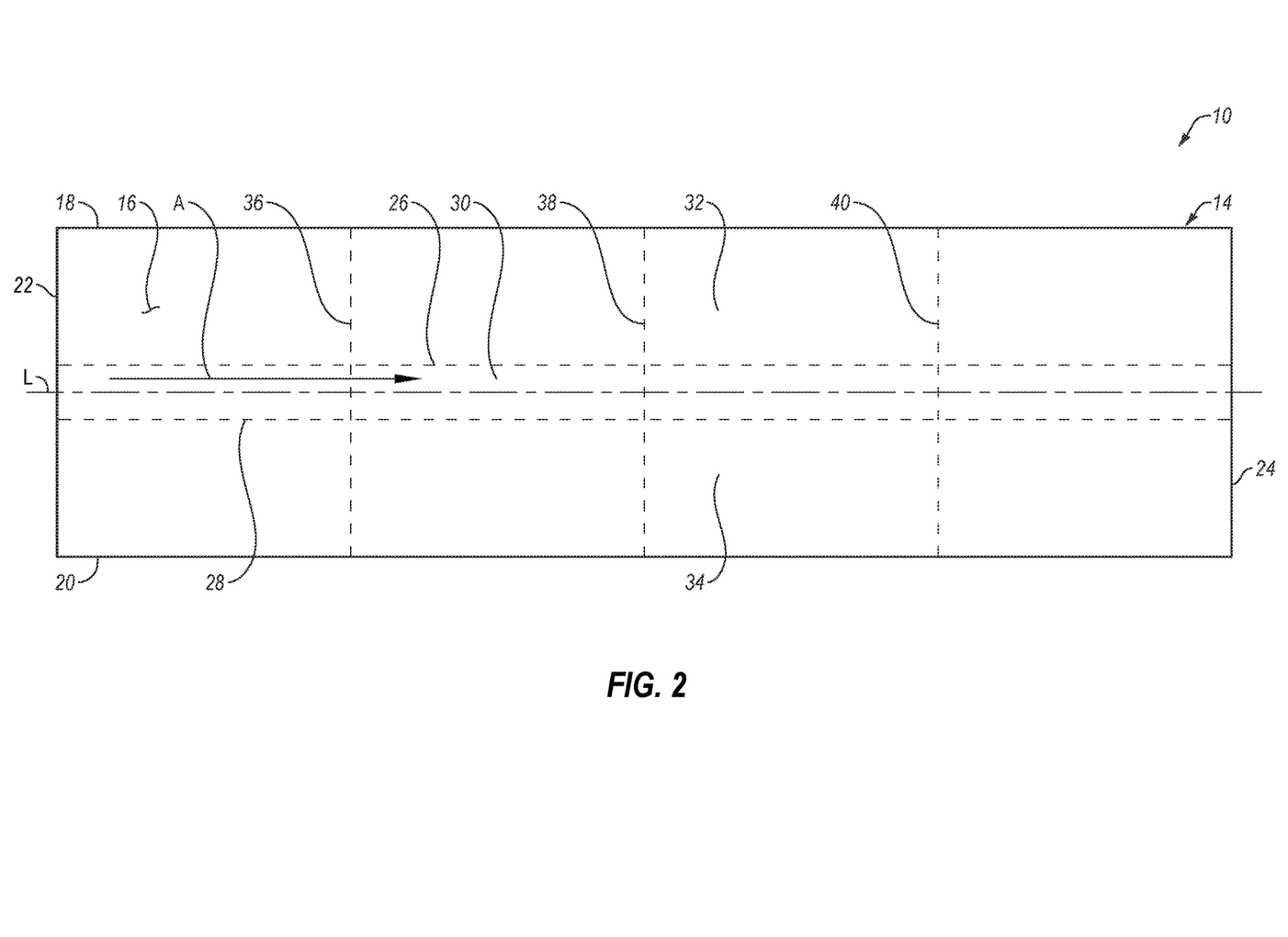
FIG. 2 is a plan view of a portion of the adhesive material illustrated in FIG. 1.

The backing material 16 may be formed from a number of different materials. Non-limiting examples of such materials include paper or paper-based materials, corrugated materials including cardboard, and polymer-based materials including various plastic materials. In certain forms, the material from which the backing material 16 is formed may include one or more reinforcing fibers or filaments to increase the strength of the backing material 16 in one or more directions and/or to provide the backing material 16 with tear and rip resistant properties. Generally speaking, the backing material 16 may exhibit strength sufficient for facilitating use of the adhesive material 10 to couple or secure one or more items.

The backing material 16 may be structured to facilitate separation or splitting of the backing material 16 along one or more predetermined areas or paths. In the illustrated form for example, the backing material 16 includes a first path 26 positioned between the first edge 18 and the second edge 20. The first path 26 extends in-line with the longitudinal axis L, the first edge 18 and the second edge 20, and also extends between the first end 22 and the second end 24 of the portion 14 of the adhesive material 10. The backing material 16 also includes a second path 28 positioned between the first edge 18 and the second edge 20. The second path 28 extends in-line with the longitudinal axis L, the first edge 18 and the second edge 20, and also extends between the first end 22 and the second end 24 of the portion 14 of the adhesive material 10. The second path 28 is spaced from the first path 26, and is positioned between the first path 26 and the second edge 20 of the backing material 16. Similarly, the first path 26 is positioned between the second path 28 and the first edge 18 of the backing material 16.

While the first path 26 and the second path 28 are illustrated as extending in-line with or parallel to one another, forms in which the orientation of one or both of the first path 26 and the second path 28 varies are possible. For example, the first path 26 and the second path 28 may extend transversely to one another and the longitudinal axis L, and may, for example, intersect one another at one or more locations between the first end 22 and the second end 24 of the portion 14 of the adhesive material 10. In one form, one or both of the first path 26 and the second path 28 may include a plurality of segments which extend transversely to adjacent segments in the respective path and the longitudinal axis L. Alternatively, the first path 26 and the second path 28 may include a curvilinear configuration having, for example, a sinusoidal pattern, although other variations are possible. As indicated above, the backing material 16 may include a single path along which the backing material 16 may be split or separated. In these forms, the single path may include any of the configurations described above. Moreover, in forms in which more than two paths along which the backing material 16 may be split or separated are present, the paths may individually or collectively include any of the configurations described above.

In one form, one or both of the first path 26 and the second path 28 may be defined by a respective row of perforations formed in the backing material 16. In this configuration, upon application of sufficient force to the backing material 16 at or near the first path 26 and/or the second path 28, the backing material 16 may be separated into a number of different portions. In one form for example, a first portion 30 of the backing material 16 may be secured or gripped at or adjacent to the first end 22 and pulled toward the second end 24 as indicated by directional arrow A such that the first portion 30 is released from a second portion 32 and a third portion 34 of the backing material 16. Alternatively, it is contemplated that a force could be applied to the backing material 16 from a direction transverse to the view plane of FIG. 2 in order to separate the first portion 30 along the first path 26 and the second path 28. Forms in which a force is applied along one or both of the first path 26 and the second path 28, or along a single path if only one is present, in the direction of arrow A are also possible for separating the second portion 32 and the third portion 34. In one form for example, the second portion 32 and the third portion 34 could be separated with the first portion 30 remaining intact with one of the second portion 32 and the third portion 34. Similarly, in forms in which only one path is present, the second portion 32 and the third portion 34 could be separated from one another without any intermediate portion, like the first portion 30, being positioned therebetween.

One or both of the first path 26 and the second path 28 may be defined by one or more alternative features which facilitate separation of the second portion 32 and the third portion 34 there along. For example, in one form, the backing material 16 could include indentations or scoring along one or both of the first path 26 and the second path 28 such that the backing material 16 fractures or separates along the first path 26 and the second path 28 instead of other locations upon the application of sufficient force. Additionally or alternatively, the backing material 16 could be formed from a variety of materials with the material along or near the first path 26 and the second path 28 being generally weaker than at other areas of the backing material 16 such that the backing material 16 fractures or separates along the first path 26 and the second path 28 instead of other locations upon the application of sufficient force. In another form, the material from which the backing material 16 is formed could be reinforced except along or near the first path 26 and the second path 28 such that the backing material 16 fractures or separates along the first path 26 and the second path 28 instead of other locations upon the application of sufficient force. Generally speaking, the backing material 16 along or near the first path 26 and the second path 28 may be weaker than other areas of the backing material 16 such that the backing material 16 fractures or separates along the first path 26 and the second path 28 instead of other locations upon the application of sufficient force.

In addition to the first path 26 and the second path 28, the backing material 16 also includes paths 36, 38 and 40 which are spaced apart from one another and positioned between the first end 22 and the second end 24 of the portion 14 of the adhesive material 10, and the backing material 16 may be separated or split along one or more of the paths 36, 38 and 40 in order to adjust the length of the portion 14 of the adhesive material 10 along the longitudinal axis L to any one of a number of different predetermined lengths. In this configuration, the size of the portion 14 of the adhesive material 10 may be adjusted to accommodate use in a number of different applications. It should be appreciated that the adhesive material 10 in the roll 12 may include a number of paths similar to the paths 36, 38 and 40 in order to facilitate selection of different lengths of the adhesive material 10 from the roll 12 dependent on the application for which the adhesive material 10 will be used.

In the illustrated form for example, the paths 36, 38 and 40 extend from the first edge 18 to the second edge 20 and transversely to the longitudinal axis L. The paths 36, 38 and 40 also generally extend in-line or parallel with one another, although forms in which one or more of the paths 36, 38 and 40 extends transversely to one or more of the other paths 36, 38 and 40 are possible. While the paths 36, 38 and 40 are illustrated as extending in-line or parallel to one another, forms in which the orientation of one or more of the paths 36, 38 and 40 varies are possible. For example, the paths 36, 38 and 40 may extend transversely to one another such that, when the backing material 16 is separated or split at or along one of the paths 36, 38 and 40, the ends of the resulting pieces of the adhesive material 10 are angled relative to the longitudinal axis L. In one form, one or more of the paths 36, 38 and 40 may include a plurality of segments which extend transversely to adjacent segments along the paths 36, 38 and 40. Alternatively, one or more of the paths 36, 38 and 40 may include a curvilinear configuration having, for example, a sinusoidal pattern, although other variations are possible.

In the illustrated form, the paths 36, 38 and 40 are generally uniformly spaced from one another and the first end 22 and the second end 24 of the portion 14 of the adhesive material 10. However, in other forms, the spacing between the paths 36, 38 and 40 and the first end 22 and the second end 24 of the portion 14 of the adhesive material 10 may vary.

In one form, one or more of the paths 36, 38 and 40 may be defined by a respective row of perforations formed in the backing material 16. In this configuration, upon application of sufficient force to the backing material 16 at or near one or more of the paths 36, 38 and 40, the backing material 16 may be separated into a number of different portions along the longitudinal axis L as described above. In one form, it is contemplated that a force could be applied to the backing material 16 from a direction transverse to the view plane of FIG. 2 in order to separate the backing material 16 along one or more of the paths 36, 38 and 40. Forms in which a force is applied along one or more of the paths 36, 38 and 40, or along a single path if only one is present, in a direction perpendicular, or substantially perpendicular, to the direction of arrow A are also possible for separating the portion 14 of the adhesive material 10 into different sections.

One or more of the paths 36, 38 and 40 may be defined by one or more alternative features which facilitate separation of the backing material 16 there along. For example, in one form, the backing material 16 could include indentations or scoring along one or more of the paths 36, 38 and 40 such that the backing material 16 fractures or separates along the 36, 38 and 40 instead of other locations upon the application of sufficient force. Additionally or alternatively, the backing material 16 could be formed from a variety of materials with the material along or near the paths 36, 38 and 40 being generally weaker than at other areas of the backing material 16 such that the backing material 16 fractures or separates along the paths 36, 38 and 40 instead of other locations upon the application of sufficient force. In another form, the material from which the backing material 16 is formed could be reinforced except along or near the paths 36, 38 and 40 such that the backing material 16 fractures or separates along the paths 36, 38 and 40 instead of other locations upon the application of sufficient force. Generally speaking, the backing material 16 along or near the paths 36, 38 and 40 may be weaker than other areas of the backing material 16 such that the backing material 16 fractures or separates along the paths 36, 38 and 40 instead of other locations upon the application of sufficient force.

Figure 3:
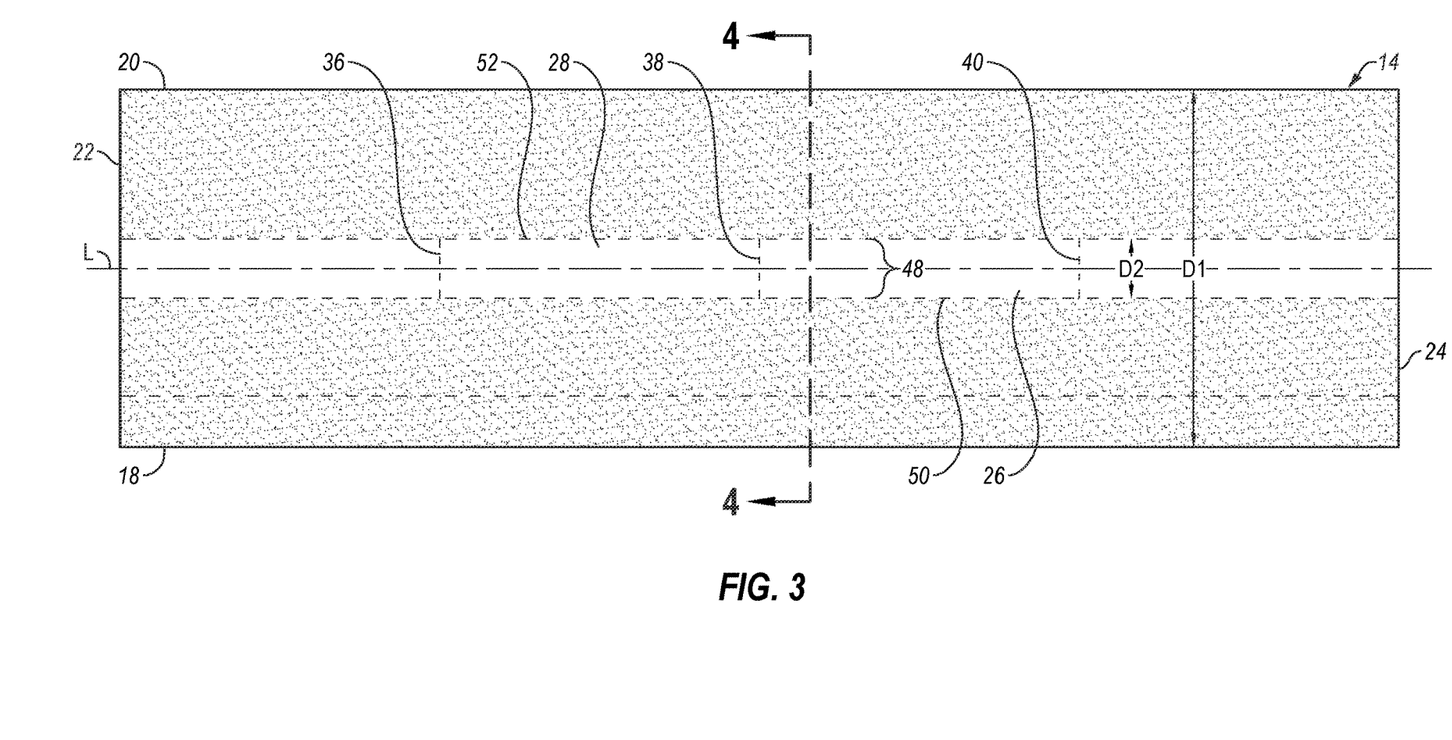
FIG. 3 is a bottom view of the portion of the adhesive material illustrated in FIG. 2.
Figure 4:
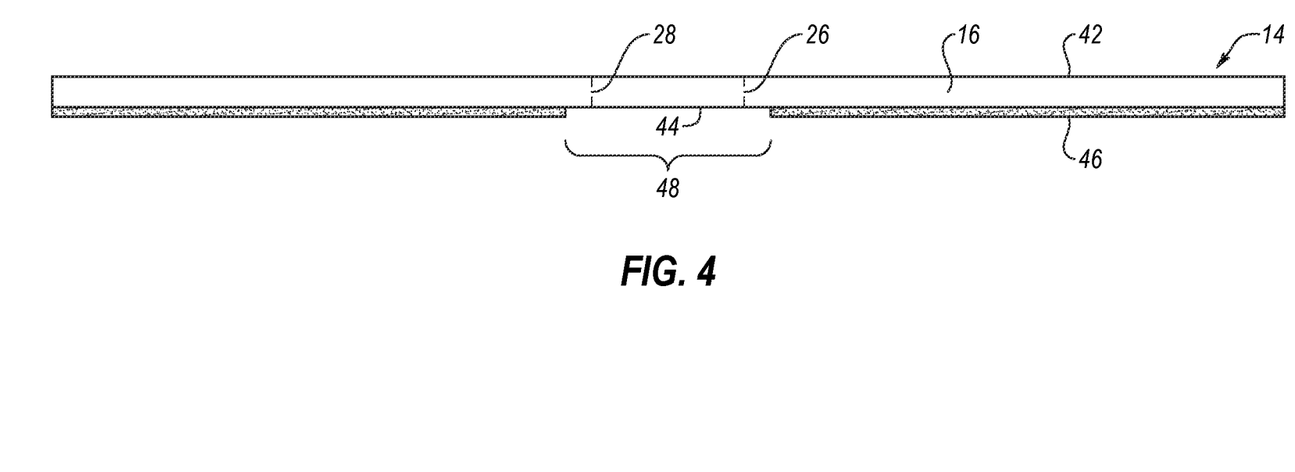
FIG. 4 is a section view of the portion of the adhesive material illustrated in FIG. 3 taken along view line 4-4.

The backing material 16 includes a first surface 42 positioned opposite of a second surface 44. An adhesive 46 is positioned on at least a portion of the second surface 44. More specifically, as illustrated in FIGS. 3 and 4 for example, the adhesive 46 extends between the first end 22 and second end 24 but is discontinuous between the first edge 18 and the second edge 20. In this configuration, the adhesive material 10 includes an adhesive-free region 48 on the second surface 44 of the backing material 16 positioned between the first edge 18 and the second edge 20. In the illustrated form for example, the first path 26 and the second path 28 are positioned in the adhesive-free region 48 such that when the adhesive material 10 is applied to one or more objects, no adhesive 46 is positioned under the first path 26 and the second path 28. Similarly, the adhesive 46 is positioned on opposite sides of the adhesive-free region 48 such that it extends from a first side 50 of the adhesive-free region 48 to the first edge 18 of the backing material 16 and from a second side 52 of the adhesive-free region 48 to the second edge 20 of the backing material 16. In this arrangement, the backing material 16 may be separated or split along one or both of the first path 26 and the second path 28 in the adhesive-free region 48.

In this form, a portion of each of the paths 36, 38 and 40 is also positioned in the adhesive-free region 48 and the adhesive 46 covers the remaining portions of the paths 36, 38 and 40 positioned on opposite sides of the adhesive-free region 48. Forms in which the adhesive 46 is also discontinuous between the first end 22 and the second end 24 are also possible. In these forms for example, the second surface 44 of the backing material may also be free of adhesive 46 along the entirety of one or more of the paths 36, 38 and 40.

The adhesive material 10 may include a first distance D1 between the first edge 18 and the second edge 20 of the backing material 16, and a second distance D2 between the first side 50 and the second side 52 of the adhesive-free region 48. The distance D2 may be between about 10% and about 40%, about 15% and about 35%, or about 20% to about 30% of the distance D1. However, other variations are possible.

The adhesive 46 may be any of a variety of adhesives suitable for adhering the adhesive material 10 to one or more items in a desired application. In one form, the adhesive 46 may be a pressure sensitive adhesive, although other variations are possible. In one aspect, the backing material 16 and the adhesive 46 may both be transparent such that the portion of the one or more items over which the adhesive material 10 is adhered may be visible, or to otherwise facilitate bar-code or other identifier scanning.

Figure 5:
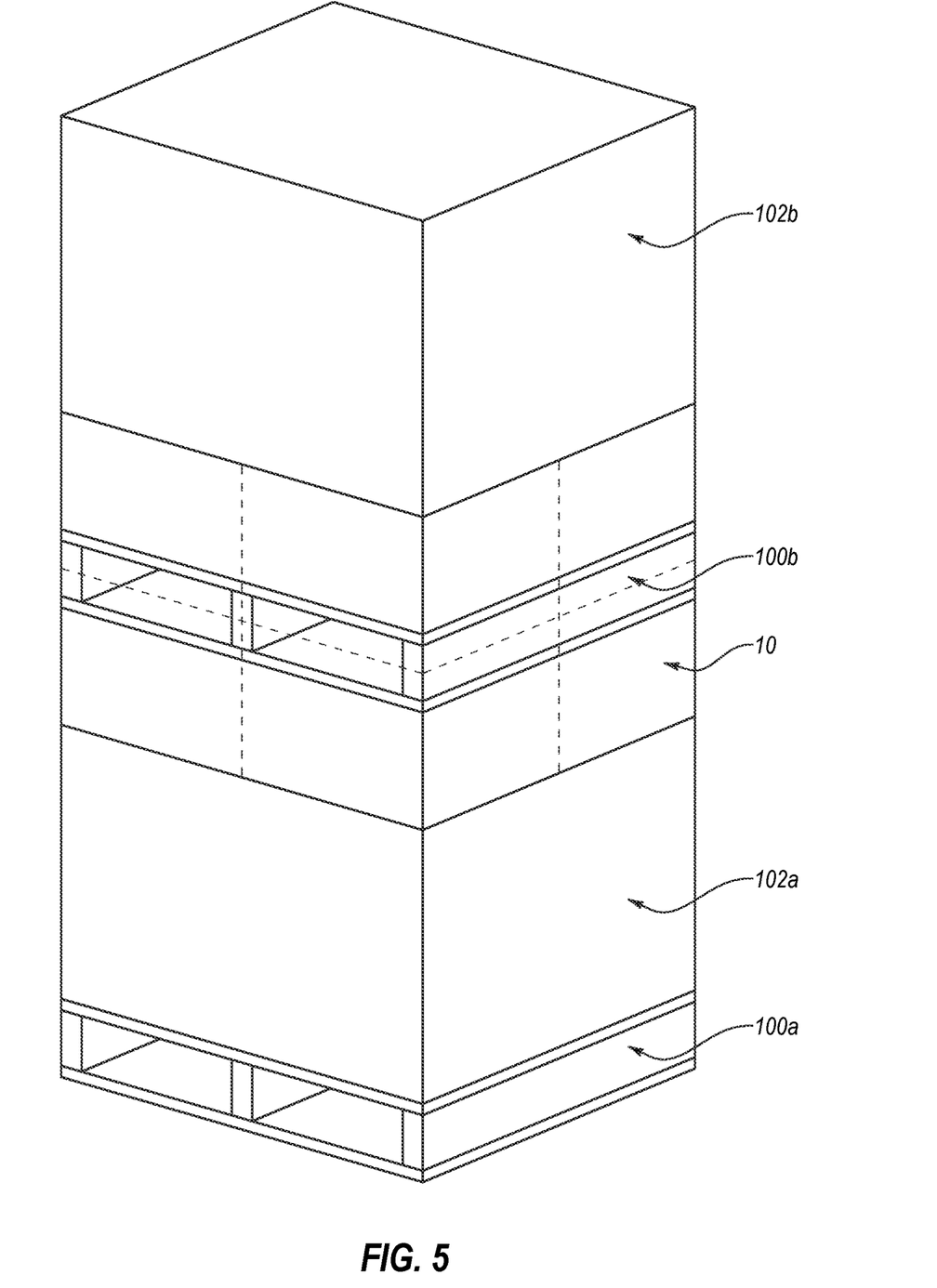
FIG. 5 is a perspective view of one non-limiting implementation of the adhesive material illustrated in FIG. 1.

The adhesive material 10 may be suitable for use in a number of different applications. With reference to FIG. 5 for example, one application in which the adhesive material 10 may be used involves securing two or more shipping pallets including cargo together. For example, a first pallet 100a including cargo 102a is positioned below a second pallet 100b including cargo 102b. When the first pallet 100a and the second pallet 100b and cargo 102a-b are being transported, it may be necessary to secure them together to, for example, prevent the second pallet 100b from becoming displaced from its position over the first pallet 100a. The adhesive material 10 may be adhered to the cargo 102a and one or both of the second pallet 100b and the cargo 102b in order to retain the positioning of the second pallet 100b relative to the first pallet 100a during transit. Once the first pallet 100a and the second pallet 100b have arrived at a desired location, the adhesive material 10 may be separated along one or more of the predefined paths as described above in order to separate the first pallet 100a and the second pallet 100b (including the cargo 102a and 102b) from one another.

While not previously discussed, the adhesive material 10 may facilitate separation of the first pallet 100a and the second pallet 100b (or other items to which the adhesive material 10 may be attached) from one another without the use of any tools. For example, an individual handling the first pallet 100a and the second pallet 100b may apply force with their hand or a portion thereof along the predetermined path(s) of the backing material 16 to split the adhesive material 10 into two or more portions. Once split in this manner, the items held together may be separated from one another while still carrying one or more respective split portions of the adhesive material 10 thereon, although the split portions of the adhesive material 10 may also be removed from the items. Amongst other things, the ability to separate the adhesive material 10 in this manner, without the use of tools, may avoid damage to the items to which the adhesive material 10 is applied, reduce unpackaging times, and eliminate the costs and planning associated with handling techniques requiring the use of tools.

With respect to the use of substantially any plural or singular terms herein, translating from the plural to the singular or from the singular to the plural may be performed as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "one or more of A, B, and C", "at least one of A, B, and C", "one or more of A, B, or C" "at least one of A, B, or C, etc." is used, in general, such a construction is intended to generally have a disjunctive interpretation (e.g., "a system having at least one of A, B, or C" or "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B." This interpretation of the phrase "A or B" is still applicable even though the term "A and/or B" may be used at times to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements.

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An adhesive material, comprising:
   a backing material including a first edge, a second edge positioned opposite of the first edge, and at least one row of perforations positioned between the first edge and the second edge; and
   an adhesive applied to a first side of the backing material;
   wherein the first side of the backing material includes an adhesive-free region and the at least one row of perforations is positioned in the adhesive-free region;
   wherein the at least one row of perforations includes a first row of perforations spaced apart from and extending in-line with a second row of perforations;
   wherein the adhesive-free region includes the first row of perforations and the second row of perforations; and
   wherein the backing material includes a first distance between the first edge and the second edge, the adhesive-free region includes a second distance between a first side thereof and a second side thereof, and the second distance is between about 15% and about 35% of the first distance.

2. The adhesive material of claim 1, wherein the adhesive is positioned on opposite sides of the adhesive-free region.

3. The adhesive material of claim 2, wherein the adhesive extends from a first side of the adhesive-free region to the first edge of the backing material and from a second side of the adhesive-free region to the second edge of the backing material.

4. The adhesive material of claim 1, wherein the backing material further includes a third row of perforations extending across and transversely to the first row of perforations and the second row of perforations.

5. The adhesive material of claim 4, wherein the third row of perforations extends between the first edge of the backing material and the second edge of the backing material.

6. The adhesive material of claim 1, wherein the second distance is between about 20% and 30% of the first distance.

7. The adhesive material of claim 1, wherein the adhesive is a pressure sensitive adhesive.

8. The adhesive material of claim 1, wherein the backing material and adhesive are transparent.

\* \* \* \* \*